United States Patent [19]

Ogawa

[11] Patent Number: 4,740,857

[45] Date of Patent: Apr. 26, 1988

[54] TINTED TAPE CASSETTE HAVING AN OPTICAL TAPE SENSING CONSTRUCTION

[75] Inventor: Kimio Ogawa, Yokohama, Japan

[73] Assignee: Victor Company of Japan, Limited, Yokohama, Japan

[21] Appl. No.: 633,377

[22] Filed: Jul. 23, 1984

[30] Foreign Application Priority Data

Jul. 25, 1983 [JP] Japan .................. 58-114374[U]
Jul. 25, 1983 [JP] Japan .................. 58-114375[U]

[51] Int. Cl.$^4$ .................. G11B 5/78; G11B 23/02; G11B 23/04; G03B 1/04
[52] U.S. Cl. .................. 360/132; 242/198
[58] Field of Search .................. 360/74.5, 132, 137; 242/197, 198, 199

[56] References Cited

U.S. PATENT DOCUMENTS

| | | | |
|---|---|---|---|
| 4,032,987 | 6/1977 | Singer et al. | 360/132 |
| 4,072,995 | 2/1978 | Sato | 360/137 |
| 4,343,024 | 8/1982 | Kawai | 360/132 |
| 4,363,059 | 12/1982 | Matsuzawa et al. | 360/132 |
| 4,452,408 | 6/1984 | Sasaki | 360/132 |
| 4,484,248 | 11/1984 | Ogiro et al. | 360/132 |
| 4,530,475 | 7/1985 | Buerkle et al. | 360/132 |

FOREIGN PATENT DOCUMENTS 2119751 11/1983 United Kingdom ............... 360/132

Primary Examiner—Robert S. Tupper
Assistant Examiner—Melissa J. Koval
Attorney, Agent, or Firm—Jordan and Hamburg

[57] ABSTRACT

A colorful and aesthetically desirable tape cassette constructed to allow a tape end sensing device, which is built in an audio or video tape recording and playback apparatus, to optically sense an end of a magnetic tape with accuracy and without malfunctions. A housing of the tape cassette shows transmittance lower than 0.05 percent at a thickness of 0.05 millimeter and reflectivity lower than about 7 percent for wavelengths of 400-1100 nanometers. Transparent windows through which one can see the tape inside the cassette are made of a transparent material containing an agent which is absorptive for near-infrared rays in the wavelength range of 400-1100 nanometers.

7 Claims, 5 Drawing Sheets

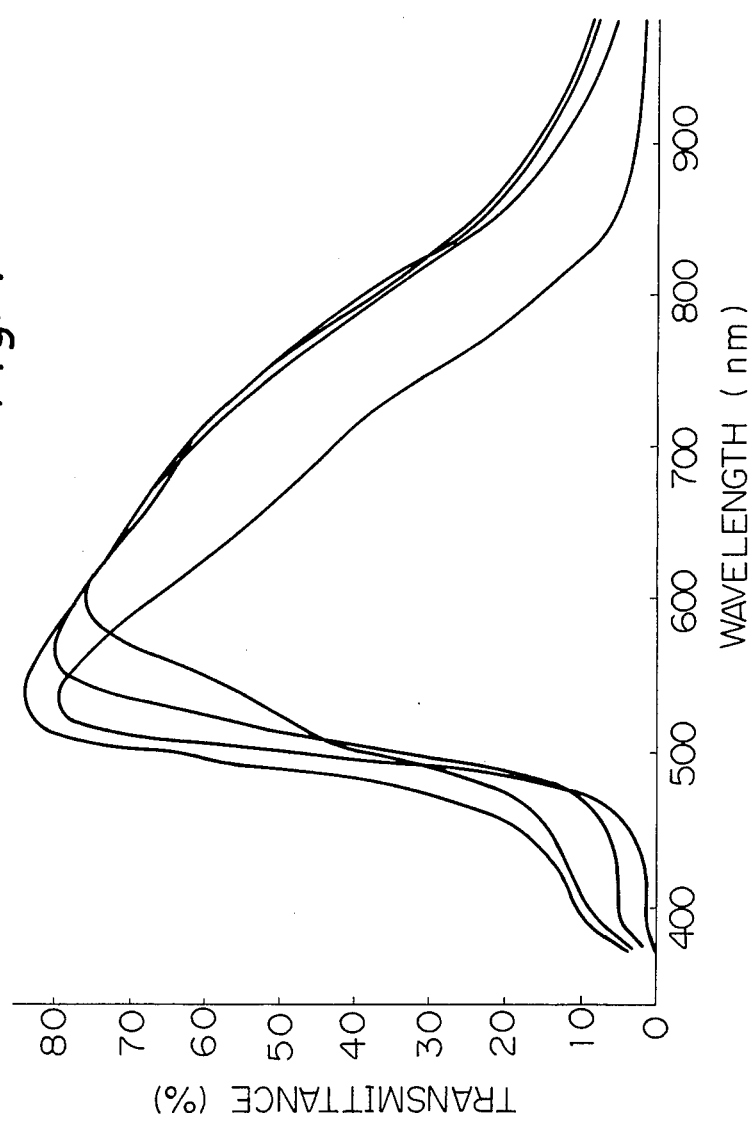

4,740,857

TINTED TAPE CASSETTE HAVING AN OPTICAL TAPE SENSING CONSTRUCTION

BACKGROUND OF THE INVENTION

The present invention relates to an improved, tinted tape cassette which allows an optical tape end sensing mechanism installed in an audio or video tape recording and playback apparatus to accurately sense an end of a magnetic tape without malfunctions.

A magnetic tape housed in a commerically available audio or video tape cassette is usually headed and tailed by clear strips. As well known in the art, as soon as a photosensor senses such a clear tape portion while the tape in the cassette is transported for recording or playback, the tape transport is interrupted. The photosensor is built in an audio or video recording and playback apparatus and customarily comprises a light emitting element and light receiving elements. These light emitting elements are so located that a light path between them is crossing the tape stretched along a tape path inside the cassette when the cassette is loaded in the apparatus. While the light receiving element is customarily located at each side of the cassette. Each light receiving element, upon sensing light issuing from the light emitting element and transmitted through a clear strip at a tape end, detects that an end of the tape has been reached, thereby causing the tape transport to be stopped. The problem encountered with this type of arrangement is occasional failures of tape end detection attributed to an unintended light reaching the light receiving element, for various reasons which causes an interruption of the tape transport and, thereby, disturbs the desired recording or playback operation.

Various kinds of light are possibly incident to either or both of-the light receiving elements mentioned above. One of them is, of course, the intended light issued from the light emitting element and transmitted through clear strips of the magnetic tape. The others are such an ambient light incident to the outer surfaces of a tape cassette and scattered thereby to the interior of the recording and playback apparatus than a part of them reaching to the light receiving element, the light incident to the tape cassette to propagate through the material constituting the cassette and, then, partly coming out of the cassette to reach the light receiving element, the light entering the tape cassette through transparent windows of the cassette, diffused within the cassette and, then, partly directed out of the cassette toward the light receiving element, etc. Should the light receiving element sense such undesired kinds of light, the tape end sensing mechanism would be actuated falsely to cause abrupt stop of tape transport despite the fact than an end of a magnetic tape is not reached.

Prevention of such malfunctions of the tape end sensing mechanism has heretofore been implemented by mixing carbon black with the material of a tape cassette to color it black so that undesired light may be prevented from entering the cassette or being reflected by outer surfaces of the cassette. The result has been a production of tape cassettes limited in black only, which are drab and far from aesthetic sensations. Where it is desired to color tape cassettes in variations such as in blue, green, brown, yellow-brown or the like for marketing reasons, the desired color is unattainable unless the amount of carbon black to be mixed with the material of the tape cassettes is reduced to zero or, if not to zero, to a significantly small value in the event of mixing a pigment or the like of that color into the material. Therefore, simply adapting a desired color to tape cassettes without considering the optical sensing mechanism would result in malfunctions of the mechanism. Due to such problemmatic situation, tape cassettes for use with a recording and playback apparatus having a tape end sensing mechanism have been colored black or almost black without exception, despite the demand for colorful tape cassettes.

SUMMARY OF THE INVENTION

It is therefore an object of the present invention to provide an improved tape cassette which promotes the accuracy of tape end detection by a photosensor.

It is another object of the present invention to provide a tape cassette which is colorful and pleasant to the eyes.

It is another object of the present invention to provide a tape cassette which is cost-effective and producible on a quantity basis.

It is another object of the present invention to provide a tape cassette made of a material capable of intercepting undesired light which tends to enter the tape cassette from outside.

It is another object of the present invention to provide an improved tape cassette which allows a tape end sensing mechanism built in an audio or video recording and playback apparatus and comprised of a photosensor to surely sense a tape end without malfunctions.

It is another object of the present invention to provide a generally improved tinted tape cassette.

A tinted tape cassette for accommodating a magnetic tape stretched partially along a tape path, and an end of the magnetic tape to be sensed optically of the present invention comprises a housing comprised of a material of which transmittance of light is lower than 0.05 percent at a thickness of 0.05 millimeter and reflectivity lower than about 7 percent in a wavelength range of 400–1100 nanometers, the material being tinted in a color other than black.

In accordance with the present invention, a colorful and aesthetically desirable tape cassette is constructed to allow a tape end sensing device, which is built in an audio or video tape recording and playback apparatus, to optically sense an end of a magnetic tape with accuracy and without malfunctions. A housing of the tape cassette shows transmittance lower than 0.05 percent at a thickness of 0.05 millimeter and reflectivity lower than about 7 percent for wavelengths of 400–1100 nanometers. Transparent windows through which one can see the tape inside the cassette are made of a transparent material containing an agent which is absorptive for near-infrared rays in the wavelength range of 400–1100 nanometers.

The above and other objects, features and advatages of the present invention will become apparent from the following detailed description taken with the accompanying drawings.

BRIEF DESCRIPTION OF THE DRAWINGS

FIG. 7 shows curves representative of transmittance of light of a material used for the transparent windows shown in FIGS. 5 and 6.

DESCRIPTION OF THE PREFERRED EMBODIMENTS

While the tinted tape cassette of the present invention is susceptible of numerous physical embodiments, depending upon the environment and requirements of use, substantial numbers of the herein shown and described embodiments have been made, tested and used and all have performed in an eminently satisfactory manner.

While the tape cassette of the present invention will be described in relation with a VTR for simplicity, it should be born in mind that it is similarly applicable to an audio tape recording and playback apparatus as well as other similar apparatuses.

Figure 1:
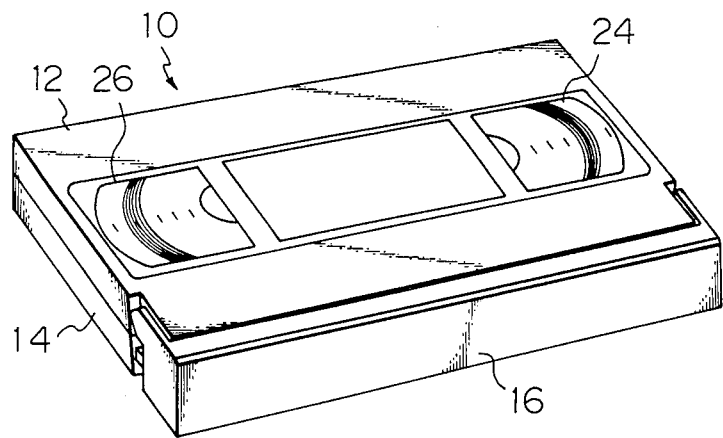
FIGS. 1 and 2 are views of a prior art tape cassette for a video tape recording and playback apparatus (VTR)
Figure 2:
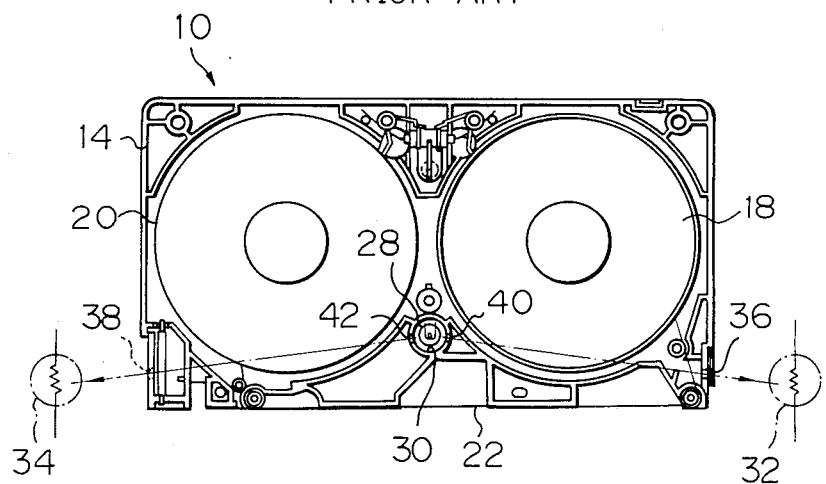

Referring to FIGS. 1 and 2, a tape cassette 10 known in the art in relation with a VTR comprises an upper half or shell 12, a lower half or shell 14, and a guard panel 16 for tape protection. The upper shell 12 is formed with transparent windows 24 and 26 to allow one to see from outside the varying radii of a magnetic tape 22 wound around reel hubs 18 and 20, which are built in the tape cassette 10. The windows 24 and 26 may be made of transparent AS resin, for example. In order that the tape cassette 10 may intercept undesired light except at the transparent windows 18 and 20, the upper shell 12, lower shell 14 and guard panel 16 are commonly formed of a material which may be about 2 millimeters thick and contains about 1 weight percent of carbon black, i.e., a material colored black.

Meanwhile, the lower shell 14 is formed with an opening 30 through which a light emitting element 28 will enter the tape cassette 10 when the latter is loaded in the apparatus. The light emitting element 28 forms a part of a photosensor, or tape end sensing mechanism, which is built in the apparatus. The opposite side walls of the cassette 10 are formed with apertures 36 and 38 so that light issuing from the light emitting element 28 may be sensed by light receiving elements 32 and 34, which form another part of the tape end sensing mechanism, when propagated as far as the light receiving elements.

When the tape cassette 10 is loaded in the apparatus, the light emitting element 28 is received in the opening 30 of the tape cassette 10. Then, the light emanating from the element 28 propagates through notched windows 40 and 42 which are contiguous with the opening 30, clear strips at opposite ends of the tape 22, and the apertures 36 and 38 in the side walls of the cassette 10. That is, as the light propagates as indicated by arrows in FIG. 2, it is sensed by the light receiving elements 32 and 34 which are installed in the apparatus. The apparatus then determines that the tape 22 has run out to its end and, so, stops the movement of the tape 22. If follows that the tape transport is inevitably interrupted to disenable recording or playback even when a failure has occurred in the light receiving element 32 such as sensing light during the operation.

In detail, as previously described, various kinds of light are generally incident to the light receiving elements 32 and 34. Needless to mention, one of them is the light issuing from the light emitting element 28 to be transmitted through a clear strip of the tape 22. The others are the light incident to the outer surfaces of the cassette 10 and diffused thereby to the interior of the apparatus to partly reach the light receiving element 32 or 34, the light incident to the cassette 10 to propagate through the material of the cassette 10 into the apparatus and, then, partly come out of the cassette 10 to reach the light receiving element 32 or 34, the light entering the cassette 10 through the transparent windows 24 and 26 to be diffused within the cassette 10 and, then, partly directed out of the cassette 10 to reach the light receiving element 32 or 34, etc. Should the light receiving element 32 or 34 sense such undesired kinds of light, the tape end sensing mechanism would be actuated to abruptly stop tape transport despite that the tape has not run out.

The adverse effect of undesirable or unnecessary light has heretofore been coped withby mixing carbon black with a material of tape cassettes, i.e., making the whole cassette appear black. This, however, limits the color available for tape cassettes to black; black cassettes being drab and far from aesthetic sensations as previously discussed.

Figure 3:
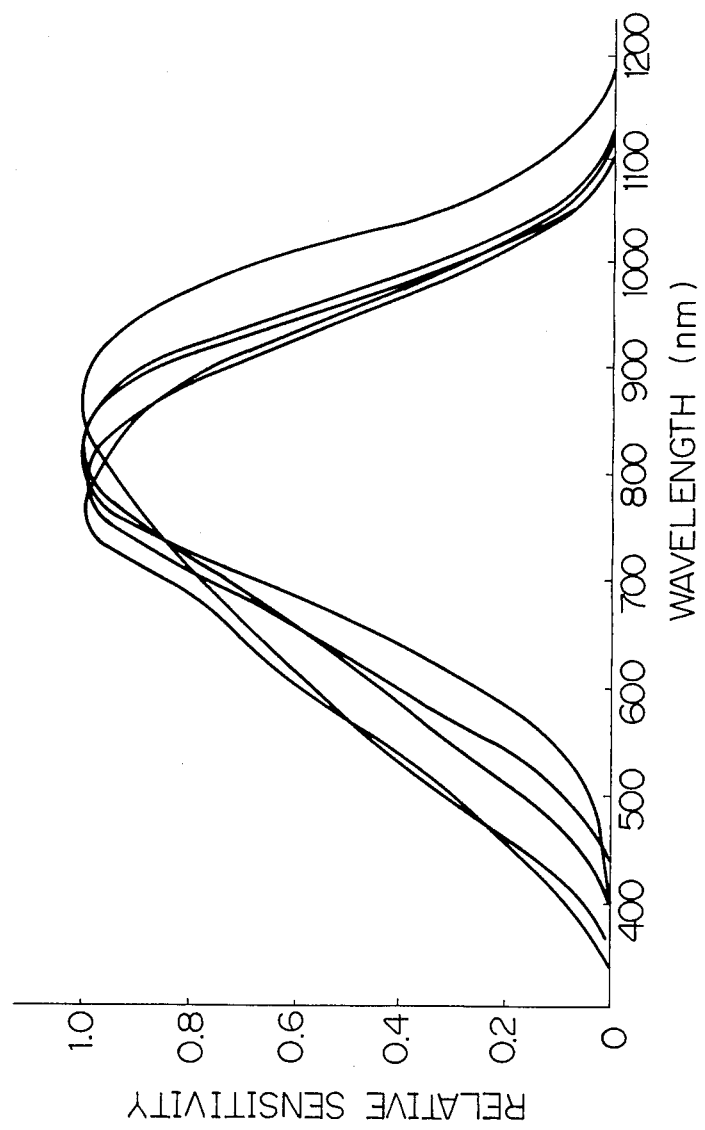
FIG. 3 shows curves representative of a spectral sensitivity characteristic of a light receiving element which forms a part of tape end sensing means of the VTR.

I conducted a series of experiments and material study with the intention of developing a colorful tape cassette which prevents external undesired light from being transmitted therethrough if made of a material with a coloring agent other than black, e.g., blue, green, brown or yellow-brown, admixed therewith. By examining the spectral sensitivity characteristic of the light receiving element which forms a part of the tape end sensing mechanism as described, I found that the light receiving element is more sensitive to light in a wavelength range of 400–1100 namometers that the other light, particularly 700–900 nanometers, as shown in FIG. 3. An arrangement should only be made, therefore, such that only the light having wavelengths in such a specific range propagates through the optical paths as indicated by the arrows in FIG. 2. Experiments revealed that assuming that the material for forming the tape cassette is about 1 millimeter thick, a cassette tape may be colored blue or the like as previously mentioned without causing the tape end sensing terminal to respond to undesired light which would otherwise penetrate the cassette, so long as that material shows transmittance lower than about 0.05 percent and reflectivity to light in the wavelength range of 400–1100 nanometers lower than about 7 percent when it is 0.35 millimeter thick.

The present invention has been elaborated based on the above findings and will now be described in detail in conjunction with its embodimens.

First, about 0.1–0.25 weight percent of carbon black, which is smaller than the conventional content, about 1 weight percent, is added to the material of the tape cassette of the present invention such as acrylonitrile styrene (AS) or ABS resin. Then, a predetermined amount of a dye or a pigment, preferably the latter, in blue, green, brown, yellow-brown or like color is mixed with the carbon black-containing material as a coloring agent. The principle of the present invention is implemented by forming the upper and lower shells and the guard panel of the tape cassette by use of the mixture of ABS resin, carbon black and pigment or dye and, for example, in the structure shown in FIGS. 1 and 2.

Figure 4:
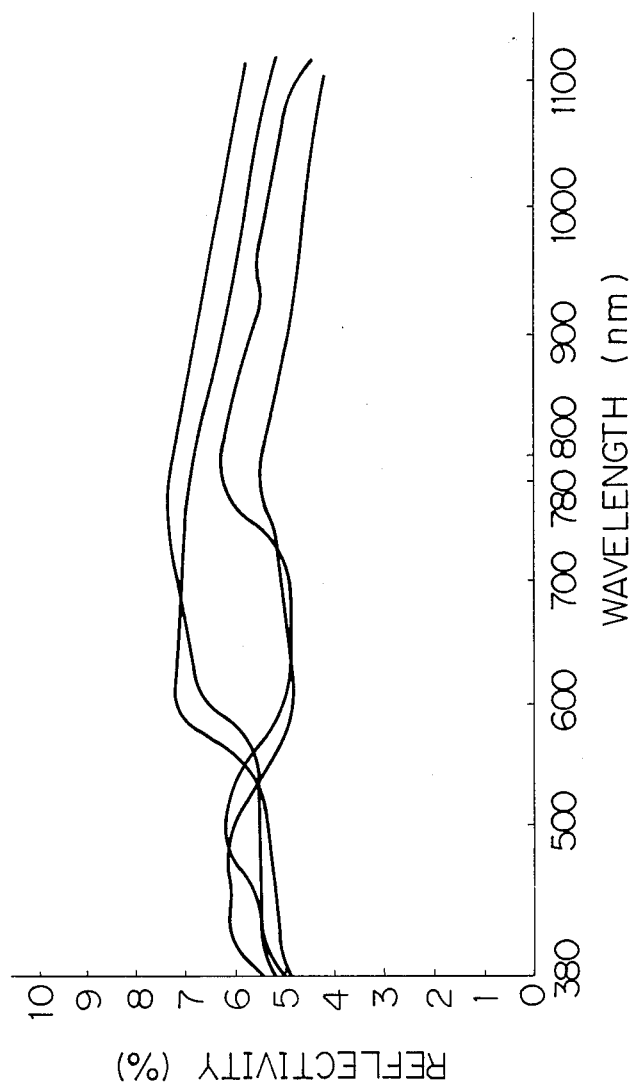
FIG. 4 shows curves repesentative of reflectivity of a tape cassette in accordance with the present invention.

It was experimentarily confirmed that the reflectivity of the tape cassette constructed as above described is, as shown in FIG. 4, less than about 7 percent for light in the wavelength range of 400–1100 nanometers. Concerning the transmittance, in the case where the material was dimensioned 0.35 millimeter thick and a tungsten lamp whose color temperature was 2000° K. was used, it was measured to be about 0.031 percent when the material contained a blue pigment, about 0.043 percent when it contained a green pigment, 0.013 percent when it contained a brown pigment, and 0.014 percent when it contained a yellow-brown pigment. Since a material for forming a tape cassette in practice is thicker than 0.35 millimeter, i.e., about 1–2 millimeters, the actual transmittance is even lower than those stated above.

As a consequence, if applied with a color other than black such as blue, green brown or yellow-brown, the tape cassette having the above construction would eliminate erroneous responses of the tape end sensing mechanism to undesirable light derived from the outside. Further, coloring by the addition of a pigment is lower in cost than any other coloring means such as painting.

In a still more effective construction, not only the tape cassette but the reels may be colored as desired in order to suppress their reflection.

In the embodiment described above, while the upper and lower shells and guard panel of the tape cassette are commonly made of a mixture of ABS resin, carbon black and pigment or the like as discussed, the transparent windows for visually checking the tape radii on the reel hubs comprise transparent members independent of the rest of the cassette and made of AS resin or the like. The transparent windows are made of a material containing an agent which is absorptive for near-infrared rays, thereby aborbing, for example, the light in the wavelength range of about 400–1100 nanometers, particularly 700–900 nanometers, as shown in FIG. 3. In this construction, although the external light may enter the tape cassette by way of the transparent windows to become incident to the light receiving elements, the tape end sensing mechanism does not respond to such light because that light has lost the wavelengths to which the light receiving elements are sensitive. The near-infrared ray absorbing agent in the transparent windows does not intercept visible rays at all and, therefore, allows one to clearly see the tape on the reel hubs without any problem. In addition, entry of near-infrared rays into the tape cassette is suppressed, proportionally suppressing adverse effect thereof on the magnetic tape.

Specific examples of the material which forms the transparent windows in accordance with the present invention will be described.

Figure 5:
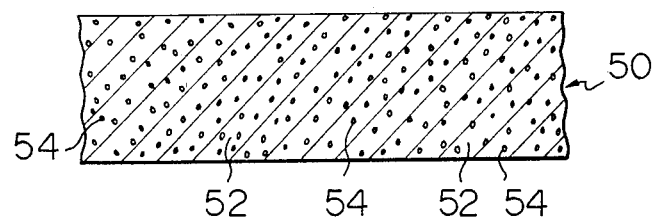
FIGS. 5 and 6 are views each showing a flat member which forms a transparent window of a tape cassette in accordance with the present invention.
Figure 6:
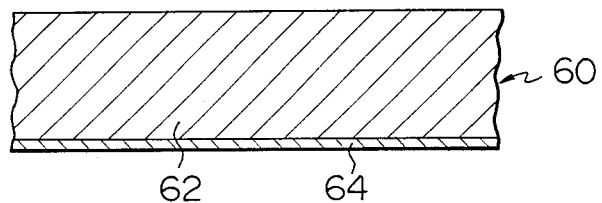

Referring to FIG. 5, a flat transparent member 50 for forming the transparent windows comprises a transparent material 52 made of AS resin or the like and containing, by a content of about 600–1000 ppm, an agent which is absorptive for near-infrared rays in the wavelength range of, for example, 400–1100 nanometers. That is, the transparent member 50 is formed by shaping a transparent resinous material which contains a near-infrared ray absorbing material by a content of 600–1000 ppm. Meanwhile, a flat transparent member 60 shown in FIG. 6 comprises a transparent material 62 made of AS resin, and a very thin layer 64 deposited on the surface of the member 60 with a near-infrared ray absorbing agent contained therein.

Measurement of transmission of the transparent members 50 and 60 showed that they cut the light in the particular wavelength range to which the light receiving elements of the tape end sensing mechanism is highly sensitive, as shown in FIG. 7. With these features, the member used as the transparent windows of the tape cassette prevents external light entered the cassette therethrough from erroneously actuating the tape end sensing mechanism even though the light may reach the light receiving elements of the mechanism.

Reel flanges adjacent to the transparent windows may be furnished with the near-infrared ray absorbing capability in order to achieve the same effect as discussed above. Further, both the transparent windows and the reel flanges may be constructed to be absorptive for near-infrared rays. For an even more effective cassette construction, the material for forming the framework, i.e., upper and lower shells and guard panel may also contain the near-infrared ray absorbing agent.

In summary, it will be seen that the present invention provides a tape cassette which is colorful and pleasant to the eyes and, in addition, promotes smooth recording or playback operation by keeping a tape end sensing mechanism of a recording and playback apparatus from a cause of malfunctions. This advantage is derived from the use of a tinted material which, assumed to be thicker than about 1 millimeter when finished as a tape cassette, shows transmittance lower than about 0.05 percent when 0.33 millimeter thick and reflectivity lower than about 7 percent for wavelengths in the range of 400–1100 nanometers.

In accordance with another characteristic feature of the present invention, transparent windows through which one can see a magnetic tape would around reel hubs inside the tape cassette comprise transparent members which are absorbtive for near-infrared rays. This eliminates adverse effect of externally derived near-infrared rays. For example, the transparent windows absorptive to such specific rays frees a tape end sensing mechanism of a recording and playback apparatus from malfunctions while the tape cassette is loaded in the apparatus and, needless to mention, does not obstruct the view of the interior of the tape cassette.

Various modifications will become possible for those skilled in the art after receiving the teachings of the present disclosure without departing from the scope thereof.

What is claimed is:

1. A tinted tape cassette adapted to operate with an apparatus having optical tape-end detecting means, said cassette accommodating a magnetic tape stretched partially along a tape path, and an end of the magnetic tape being sensed optically by allowing to pass through said end a light emitted and received by said optical tape-end detecting means, said cassette comprising a housing having an upper shell, a lower shell and a guard panel, at least one transparent window means provided in said upper shell to thereby make the magnetic tape visible outside the cassette, said window means comprising an agent which absorbs near-infrared rays from the light incident to said window, said housing being made of a housing material comprising a resin, 0.1 to 0.25 weight percent of carbon black, and a coloring material other than carbon black, said coloring material providing a tinted color to said housing material, said housing having a light path along which said light travels, said housing material having the characteristic in which the transmittance of light is lower thant 0.05 percent when the thickness of the housing material is 0.05 millimeter, said housing material having a reflectivity which is lower than about 7 percent for a wavelength range of 400–1100 nanometers such that said housing material prevents undesired light from being transmitted through the housing material to said optical tape-end detecting means to thereby preclude erroneous actuation of said optical tape-end detecting means.

2. A tinted tape cassette as claimed in claim 1, further comprising a pair of colored reels for winding the magnetic tape therearound.

3. A tinted tape cassette as claimed in claim 1, in which said material is thicker than 1 millimeter.

4. A tinted tape cassette as claimed in claim 1, in which the agent is absorptive for light having a wavelength in the range for 400–1100 nanometers.

5. A tinted tape cassette as claimed in claim 4, in which the transparent material contains said agent in an amount of 600–1000 ppm of said transparent material.

6. A tinted tape cassette as claimed in claim 1, further comprising a pair of reels for winding the magnetic tape therearound, said reels being made of a material containing a near-infrared ray absorbing agent therein.

7. A tinted tape cassette as claimed in claim 1, further comprising means for housing internally of the cassette a light emitting element of said optical tape-end detecting means and means for allowing said light travelling along said light path to reach to a light receiving element of said optical tape-end detecting means and to cross said tape path when said cassette operates with said apparatus.

* * * * *